US006975715B1

United States Patent
Hettish

(10) Patent No.: US 6,975,715 B1
(45) Date of Patent: Dec. 13, 2005

(54) SYSTEM AND METHOD FOR REPORTING THE ADDITION AND DELETION OF TAPI LINE AND PHONE DEVICES IN ABSENCE OF SUCH NOTIFICATION FROM A PBX

(75) Inventor: Mark Bernard Hettish, Cary, NC (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/501,134

(22) Filed: Feb. 9, 2000

(51) Int. Cl.⁷ .............................................. H04M 3/42
(52) U.S. Cl. ............................. 379/201.01; 379/201.03
(58) Field of Search ...................... 379/201.01, 201.03, 379/211.02, 319, 229, 230, 201.02, 198, 32.01

(56) References Cited

U.S. PATENT DOCUMENTS

| 4,972,453 A | * | 11/1990 | Daniel et al. ............... 379/9.03 |
| 5,574,888 A | | 11/1996 | Panditji et al. ............. 395/500 |
| 5,940,488 A | | 8/1999 | DeGrazia et al. ........... 379/201 |
| 6,356,631 B1 | * | 3/2002 | Krishnan ................ 379/201.01 |
| 6,618,476 B1 | * | 9/2003 | Szeto et al. .................. 379/198 |
| 2003/0002642 A1 | * | 1/2003 | Jorasch et al. | |

FOREIGN PATENT DOCUMENTS

| EP | 0 840 490 A2 | | 5/1998 | |
| GB | 2 341 291 A | | 9/1998 | |
| GB | 2 341 2991 | * | 8/2000 | ........... H04M 3/42 |

* cited by examiner

Primary Examiner—William J. Deane, Jr.

(57) ABSTRACT

A TAPI service provider may request configuration information from hardware such as a PBX. Configuration information received from the hardware is stored in a list and compared to the existing configuration list. Two new lists are then generated: an added list and a deleted list. All devices in the deleted list are deleted from the internal database and deleted messages are sent to the TAPI service provider. All new devices are temporarily added to the internal database and addition messages are sent to the TAPI service provider. The new device configuration list is then saved, and the added devices are marked as permanent.

12 Claims, 5 Drawing Sheets

SYSTEM AND METHOD FOR REPORTING THE ADDITION AND DELETION OF TAPI LINE AND PHONE DEVICES IN ABSENCE OF SUCH NOTIFICTION FROM A PBX

RESERVATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records available to the public, but otherwise reserves all copyright rights whatsoever.

BACKGROUND OF THE INVENTION

1. Field of the Invention

The present invention relates to communications systems and, in particular, to a communication system employing a private branch exchange (PBX) and a TAPI interface.

2. Description of the Related Art

The Telephony Application Programming Interface (TAPI) is a high level programming interface for Windows™ which supports many types of telephony applications associated with conventional analog public telephone lines, PBX phone lines, ISDN phone lines, and the like. Thus, TAPI allows a communication application to support numerous telephony operations through a variety of mediums by making a function call to TAPI which will drive the hardware (fax/modem card, DSP card, network switch, and the like) coupled thereto.

The TAPI architecture 100 is illustrated in FIG. 1. As shown, the TAPI architecture 100 includes a TAPI implementation 104 interfaced to telephony application programs 102. TAPI 104 provides a connection to a TAPI service provider, such as a TAPI server 106, which then interfaces to hardware such as voices cards 108a, H.323 interfaces 108b, or PBX's 108c.

The TAPI specification requires that device configuration information be available at the startup of the TAPI service provider. If unsolicited addition and deletion events from a telephony device hardware, such as a PBX, are not supported (i.e., the hardware does not automatically inform the TAPI service provider of updates), the TAPI service provider can only do configuration change updates at start up. The TAPI service provider does so by requesting the static device configuration from the PBX, building the initial internal database and reporting all the devices to the TAPI. If changes are made on the PBX, the telephony server system administrator would be required to shut down the TAPI service provider and restart it again. This has the disadvantage of disrupting service to all users of the TAPI service provider. Moreover, in such a system, there is no way to shut down a TAPI service provider if it is in use. It will be shut down only if every TAPI application using it shuts down. Since several thousand clients can be supported, this can provide severe disadvantages in administration.

SUMMARY OF THE INVENTION

These and other drawbacks in the prior art are overcome in large part by a system and method for client configuration in a TAPI environment according to the present invention. Briefly, the present invention provides a method whereby a TAPI service provider may request configuration information from hardware such as a PBX. Configuration information received from the hardware is stored in a list and compared to the existing configuration list. Two new lists are then generated: an added list and a deleted list. All devices in the deleted list are deleted from the internal database and deleted messages are sent to the TAPI service provider. All new devices are temporarily added to the internal database and addition messages are sent to the TAPI service provider. The new device configuration list is then saved, and the added devices are marked as permanent.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
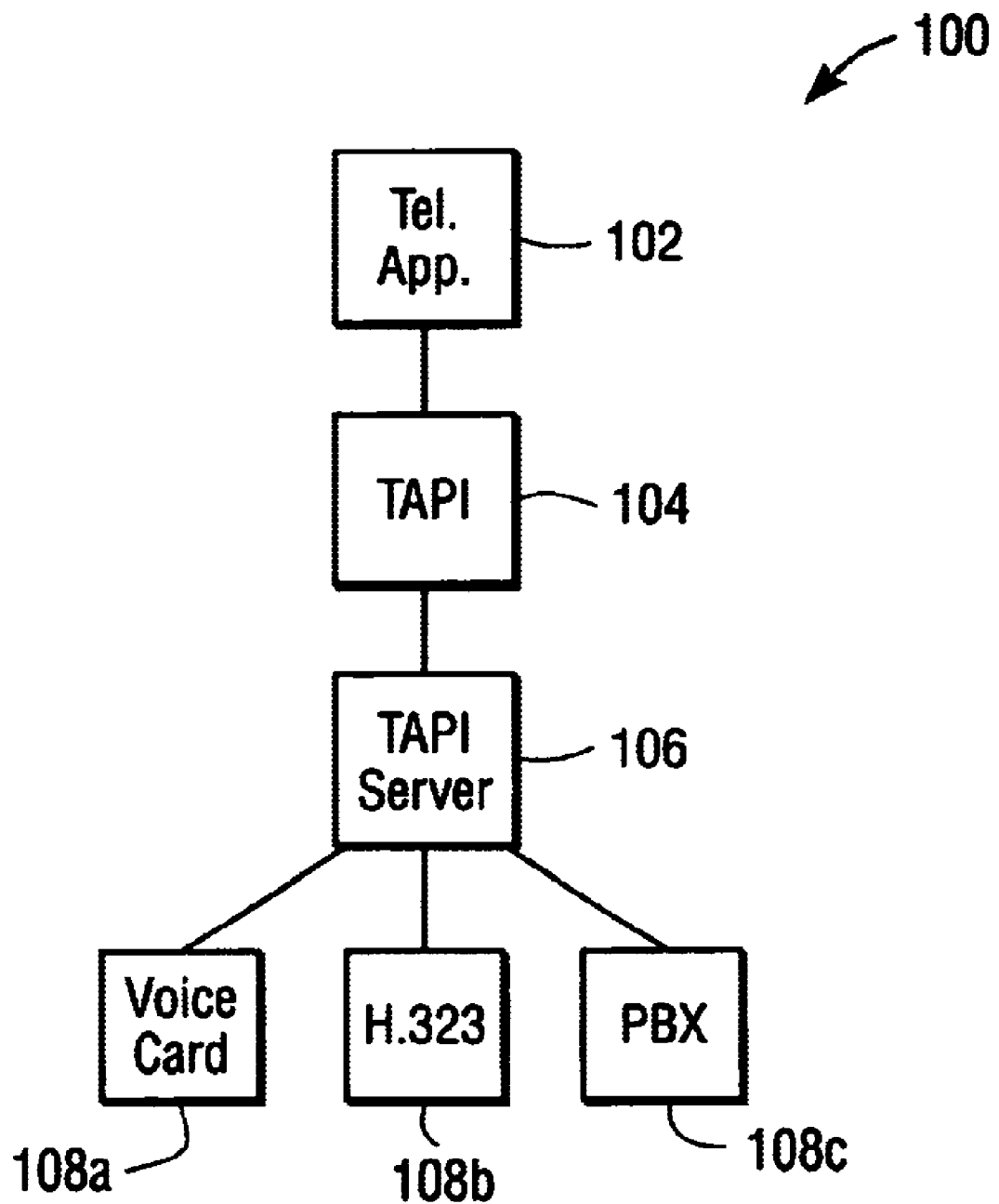
FIG. 1 is a diagram representative of the TAPI architecture.
Figure 2:
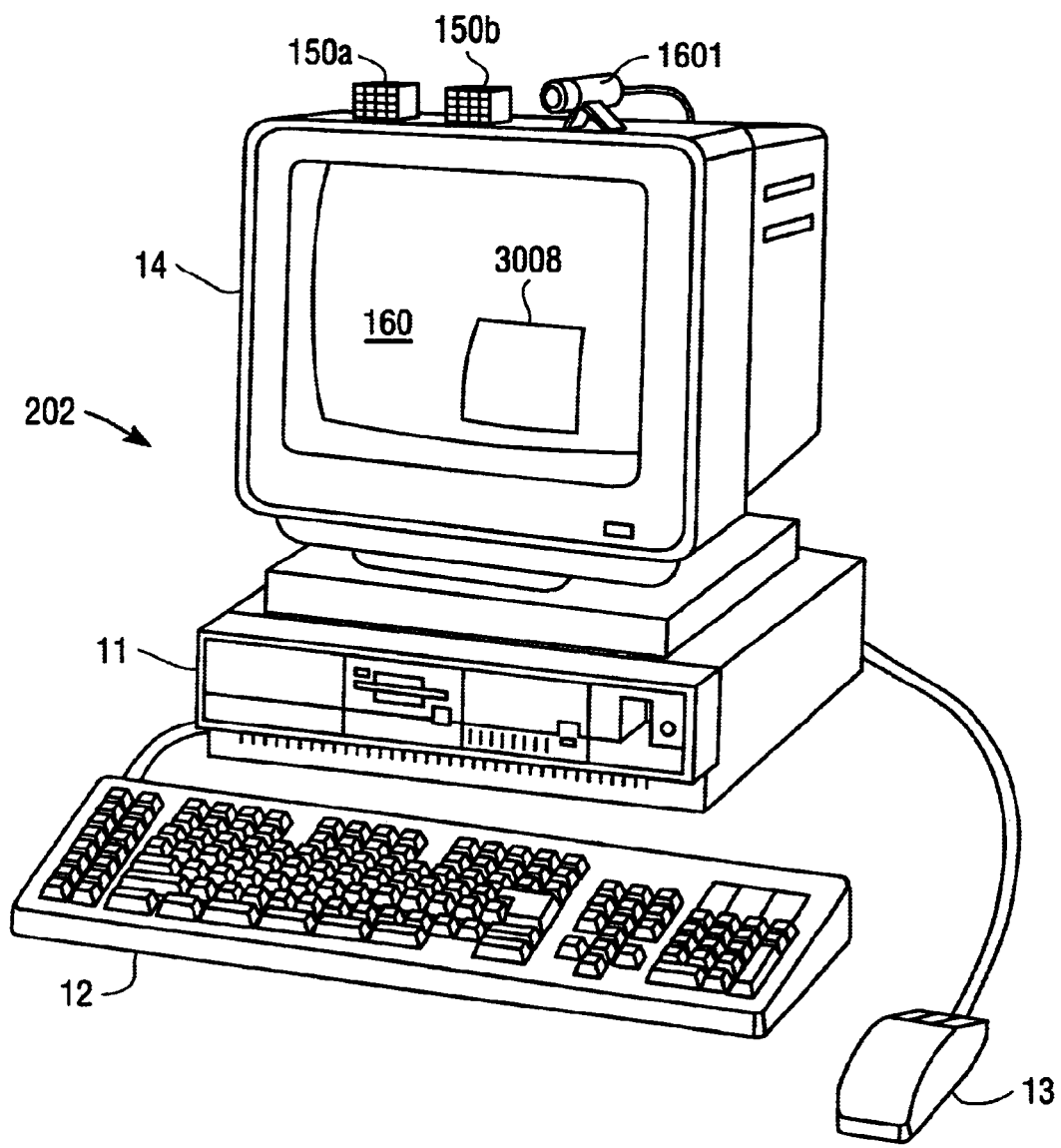
FIG. 2 is a diagram illustrating a computer system employing a TAPI system according to an implementation of the present invention.
Figure 3:
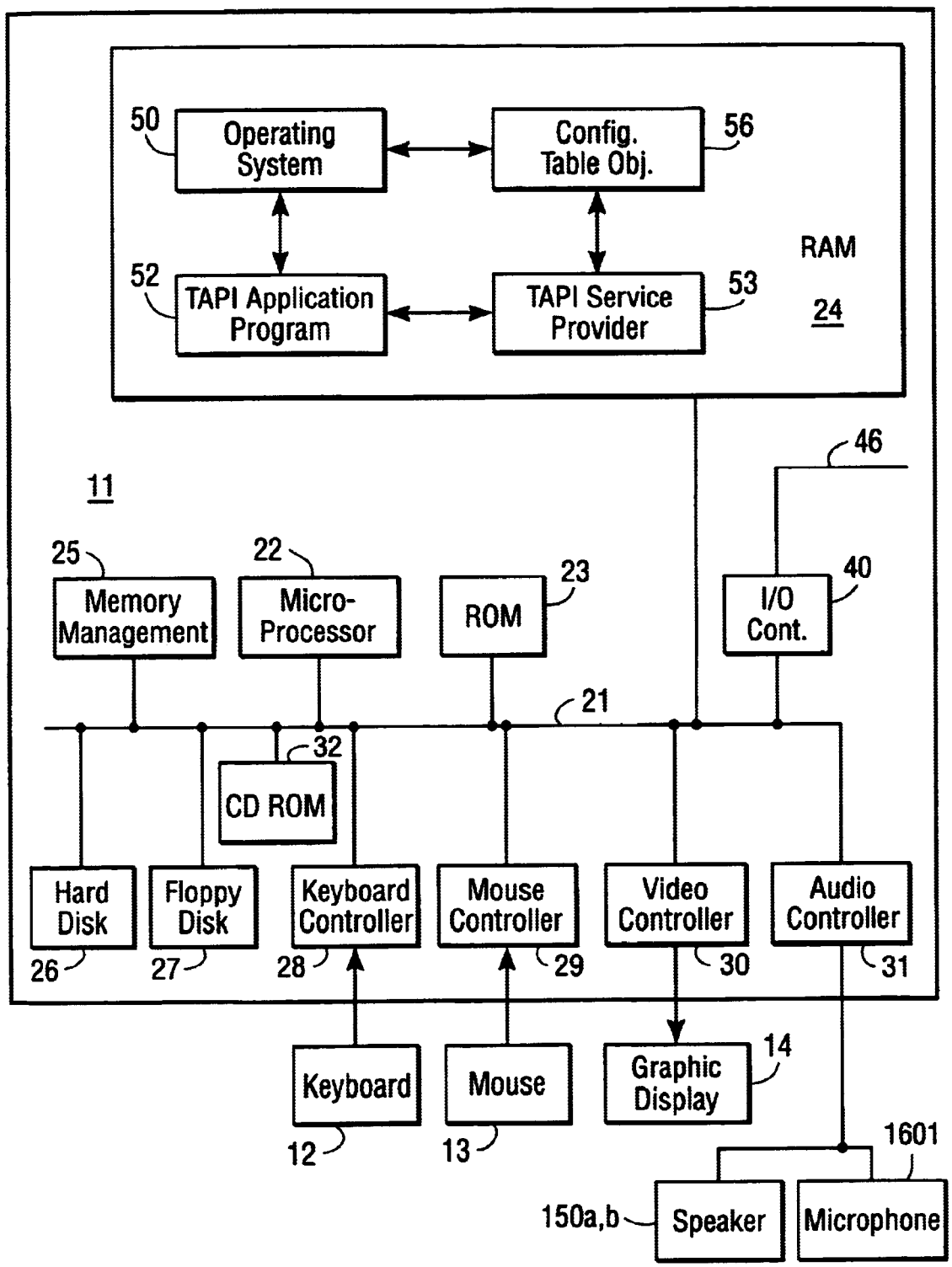
FIG. 3 is a block diagram of the computer system of FIG. 2 according to an implementation of the present invention.

FIGS. 2–4 illustrate an improved system and method for a TAPI service provider to request and update configuration information from hardware such as a PBX. Configuration information received from the hardware is stored in a list and compared to the existing configuration list. Two new lists are then generated: an added list and a deleted list. All devices in the deleted list are deleted from the internal database and deleted messages are sent to the TAPI service provider. All new devices are temporarily added to the internal database and addition messages are sent to the TAPI service provider. The new device configuration list is then saved, and the added devices are marked as permanent.

An exemplary TAPI client 202 is shown in FIG. 2. The TAPI client 202 may be embodied as a personal computer, including a system unit 11, a keyboard 12, a mouse 13, and a display 140. Also shown are one or more speakers 150a, 150b, and a microphone 1601. The screen 160 of the display device 14 is used to present a graphical user interface (GUI) and particularly, a TAPI client window 3008. The graphical user interface supported by the operating system allows the user to employ a point and click method of input, i.e., by moving the mouse pointer or cursor (not shown) to an icon representing a data object at a particular location on the screen 160 and pressing one or more of the mouse buttons to perform a user command or selection. The GUI may be any of the Windows GUIs available from Microsoft Corporation or the Macintosh OS, available from Apple Computer.

FIG. 3 shows a block diagram of the components of the personal computer shown in FIG. 2. The system unit 11 includes a system bus or a plurality of system buses 21 to which various components are coupled and by which communication between the various components is accomplished. The microprocessor 22 is coupled to the system bus 21 and is supported by the read only memory (ROM) 23 and the random access memory (RAM) 24 also connected to the system bus 21. The microprocessor 22 may be embodied as any of a variety of microprocessors, including Intel x86, Pentium or Pentium II or compatible processors.

The ROM 23 contains among other code the basic input output system (BIOS) which controls basic hardware operations such as the interaction of the disk drives and the keyboard. The RAM 24 is the main memory into which the operating system and applications programs are loaded. The memory management chip 25 is connected to the system bus 21 and controls direct memory access operations including passing data between the RAM 24 and hard disk drive 26 and floppy disk drive 27. A CD ROM drive (or DVD or other optical drive) 32 may also be coupled to the system bus 21 and is used to store a large amount of data, such as a multimedia program or a large database.

Also connected to the system bus 21 are various I/O controllers: The keyboard controller 28, the mouse controller 29, the video controller 30, and the audio controller 31. The keyboard controller 28 provides the hardware interface for the keyboard; the mouse controller 29 provides the hardware interface for the mouse 13; the video controller 30 is the hardware interface for the video display 14; and the audio controller 31 is the hardware interface for the speakers 15 and microphone 16. The speakers 150a, b and the microphone 1601 allow for audio communication during telephony operation. In operation, keyboard strokes are detected by the keyboard controller 28 and corresponding signals are transmitted to the microprocessor 22; similarly, mouse movements and button clicks are detected by the mouse controller and provided to the microprocessor 22. Typically, the keyboard controller 28 and the mouse controller 29 assert interrupts at the microprocessor 22. In response, the microprocessor 22 executes a corresponding interrupt routine, as is known. Additionally, an interrupt controller (not shown) may be provided to arbitrate among interrupt requests. An I/O controller or network interface 40 enables communication over a network 46, such as a packet network.

One embodiment of the present invention is as a set of instructions in a code module resident in the RAM 24. Until required by the computer system, the set of instructions may be stored in another computer memory, such as the hard disk 26, on an optical disk for use in the CD ROM drive 32, or a floppy disk for use in the floppy disk drive 27.

As shown in the figure, the operating system 50, the TAPI application 52, the TAPI service provider 53, and one or more configuration table objects 56 are resident in the RAM 24. As is known, the operating system 50 functions to generate a graphical user interface on the display 14. The TAPI application program 52 performs TAPI functionality, including generation of a TAPI client window 3008 (FIG. 2) in the GUI. The TAPI service provider 53 implements an interface to the hardware, as will be described in greater detail below.

Figure 4A:
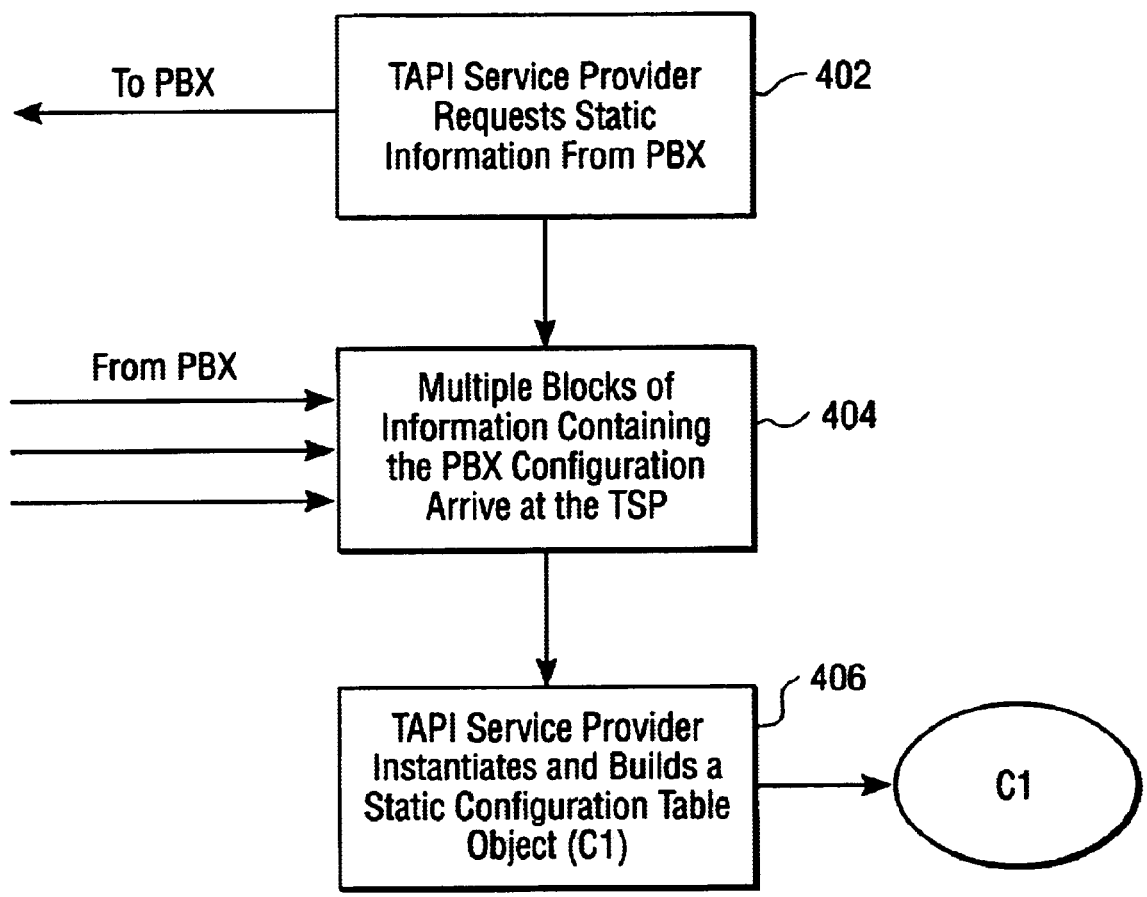
FIG. 4A and FIG. 4B are flowcharts illustrating operation of an implementation of the invention.
Figure 4B:
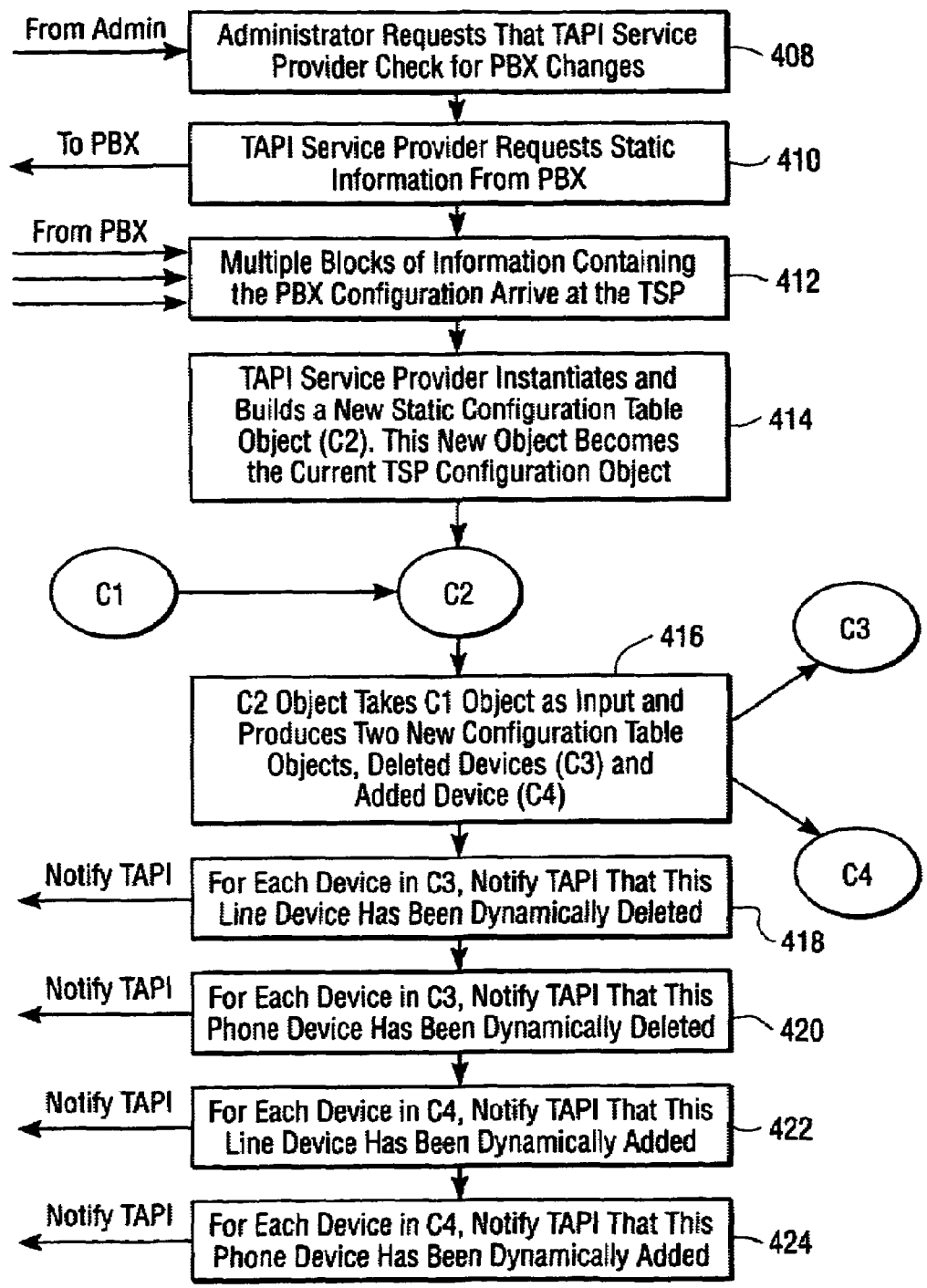

Turning now to FIGS. 4A and 4B, a flowchart illustrating operation of an implementation of the invention is shown. Upon startup, in a step 402, the TAPI service provider 53 requests static configuration information from the PBX (not shown) or other telephony hardware. Such static configuration information can be static line or static phone device information. In the case of a line device, the configuration information includes the device ID and the number of addresses on the line. In the case of a phone device, the information includes the device ID. Turning back to FIG. 4A, in a step 404, the PBX returns multiple blocks of information of PBX configuration information to the TAPI service provider 53. Next, in a step 406, the TAPI service provider 53 instantiates and builds a static configuration table object (C1).

In normal operation, devices are added or deleted to the PBX without notifications being sent to the TAPI service provider 53. Turning now to FIG. 4B, in a step 408, the administrator may request the TAPI service provider 53 check for PBX configuration changes. In a step 410, the TAPI service provider 53 requests static information from the PBX. In a step 412, multiple blocks of information containing the PBX configuration data arrive at the TAPI service provider 53. In a step 414, the TAPI service provider 53 instantiates and builds a new static configuration table object (C2). This new object becomes the current TAPI configuration object. In a step 416, the TAPI service provider 53 takes the C2 object as an input and produces two new configuration table objects: deleted objects (C3) and added devices (C4).

In a step 418, for each device in C3, the TAPI application 52 is notified that the corresponding line device has been deleted. In a step 420, for each device in C3, the TAPI application 52 is notified that the corresponding phone device has been deleted. In a step 422, for each device in C4, the TAPI application 52 is notified that the corresponding line device has been added. Finally, in a step 424, for each device in C4, the TAPI application 52 is notified that the corresponding phone device has been added.

Further details regarding a specific implementation of a system and method according to the present invention are shown in the attached Appendix. It is noted, however, that the invention is not limited to the specific form set forth herein, but includes such alternatives, modifications and equivalents as can reasonably be included within the spirit and scope of the appended claims.

What is claimed is:

1. A method for updating configuration information in a TAPI system, comprising:
   a TAPI service provider storing configuration information in a first configuration table object;
   a TAPI service provider requesting update static configuration information from a telephony device;
   a TAPI service provider receiving said update static configuration information; and
   a TAPI service provider storing said static update configuration information for system use as a second configuration table object.

2. A method in accordance with claim 1, further comprising generating a deleted devices configuration table object and an added devices configuration table object.

3. A method in accordance with claim 2, comprising notifying said TAPI system that each device in said deleted devices configuration table object has been dynamically deleted.

4. A method in accordance with claim 2, comprising notifying said TAPI system that each device in said added devices configuration table object has been dynamically deleted.

5. A TAPI system, comprising:
   means associated with a TAPI service provider for storing configuration information in a first configuration table object;
   means associated with a TAPI service provider for requesting update static configuration information from a telephony device;
   means associated with a TAPI service provider for receiving said update static configuration information; and
   means associated with a TAPI service provider for storing said static update configuration information for system use as a second configuration table object.

6. A system in accordance with claim 5, said storing means further comprising means for generating a deleted devices configuration table object and an added devices configuration table object.

7. A system in accordance with claim 6, further comprising means for notifying said TAPI system that each device in said deleted devices configuration table object has been dynamically deleted.

8. A system in accordance with claim 6, further comprising means for notifying said TAPI system that each device in said added devices configuration table object has been dynamically deleted.

9. A system in accordance with claim 6, said TAPI service provider further adapted to notify a TAPI application that each device in said deleted devices configuration table object has been dynamically deleted.

10. A system in accordance with claim 6, said TAPI service provider further adapted to notify a TAPI application that each device in said added devices configuration table object has been dynamically deleted.

11. A TAPI system, comprising:
  a TAPI service provider adapted to store configuration information received from a telephony device in a first configuration table object; and
  a telephony device adapted to transmit update static configuration information to said TAPI service provider;
  wherein said TAPI service provider is adapted to store said static update configuration information for system use as a second configuration table object.

12. A system in accordance with claim 11, said TAPI service provider further adapted to generate a deleted devices configuration table object and an added devices configuration table object.

* * * * *